(12) United States Patent
Roh et al.

(10) Patent No.: US 9,793,532 B2
(45) Date of Patent: Oct. 17, 2017

(54) RECHARGEABLE BATTERY

(71) Applicant: SAMSUNG SDI CO., LTD., Yongin-si, Gyeonggi-do (KR)

(72) Inventors: Sae-Weon Roh, Yongin-si (KR); Sung-Ho Song, Yongin-si (KR); Jung-Hyun Park, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 96 days.

(21) Appl. No.: 14/089,789

(22) Filed: Nov. 26, 2013

(65) Prior Publication Data

US 2014/0220424 A1     Aug. 7, 2014

(30) Foreign Application Priority Data

Feb. 4, 2013    (KR) ........................ 10-2013-0012602

(51) Int. Cl.
    *H01M 2/30*      (2006.01)
    *H01M 2/04*      (2006.01)

(52) U.S. Cl.
    CPC .......... *H01M 2/30* (2013.01); *H01M 2/0473* (2013.01)

(58) Field of Classification Search
    None
    See application file for complete search history.

(56) References Cited

U.S. PATENT DOCUMENTS

| | | | |
|---|---|---|---|
| 5,761,792 A * | 6/1998 | Alexandres | H01M 2/105 29/623.3 |
| 2003/0108780 A1 | 6/2003 | Iwaizono et al. | |
| 2007/0232123 A1 | 10/2007 | Uh | |
| 2011/0076532 A1 | 3/2011 | Ha | |
| 2012/0142230 A1* | 6/2012 | Baek | H01M 2/22 439/754 |
| 2012/0301748 A1* | 11/2012 | Choi | H01M 2/0486 429/7 |

FOREIGN PATENT DOCUMENTS

| | | |
|---|---|---|
| JP | 62-157060 U | 10/1987 |
| JP | 2002-208395 A | 7/2002 |
| JP | 2003-217562 | 7/2003 |

(Continued)

OTHER PUBLICATIONS

Extended European Search Report dated Apr. 7, 2014.

(Continued)

*Primary Examiner* — Daniel Gatewood
(74) *Attorney, Agent, or Firm* — Lee & Morse, P.C.

(57) ABSTRACT

A rechargeable battery includes an electrode assembly including a first electrode plate, a second electrode plate, and a separator between the first electrode plate and the second electrode plate, a can in which the electrode assembly is accommodated, the can including an opening at one side, the opening being hermetically sealed by a cap plate, and a top plate on the cap plate. The top plate includes a first welding unit and a second welding unit that are coupled to the cap plate, and a third welding unit that is between the first welding unit and the second welding unit. The first welding unit is connected to the cap plate and includes first through third welding points. The first through third welding points collectively forming a triangular shape.

15 Claims, 4 Drawing Sheets

(56) References Cited

FOREIGN PATENT DOCUMENTS

| | | |
|---|---|---|
| JP | 2005-243451 A | 9/2005 |
| JP | 2010-055865 | 3/2010 |
| JP | 2010-186705 | 8/2010 |
| JP | 2010186705 A * | 8/2010 |
| KR | 2001-0043946 A | 5/2001 |
| KR | 10-2006-0027252 A | 3/2006 |
| KR | 10-0724065 B1 | 5/2007 |
| KR | 10-2011-0035427 A | 4/2011 |
| KR | 10-2012-0133021 A | 12/2012 |

OTHER PUBLICATIONS

Korean Registration Determination Certificate dated Aug. 29, 2014.
Chinese Office Action dated Feb. 17, 2017, in the examination of the Chinese Patent Application No. 201410031223.4.
1st Office Action issued by the Japanese Patent Office dated Jun. 27, 2017 in the examination of the Japanese Patent Application No. 2013-139891.

* cited by examiner

RECHARGEABLE BATTERY

CROSS-REFERENCE TO RELATED APPLICATION

Korean Patent Application No. 10-2013-0012602, filed on Feb. 4, 2013, in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

Secondary batteries which may be recharged with electricity, unlike primary batteries which may not be recharged with electricity, are widely used to compact high-tech electronic devices such as mobile phones, personal digital assistants (PDAs), and notebook computers.

SUMMARY

Embodiments are directed to a rechargeable battery including an electrode assembly including a first electrode plate, a second electrode plate, and a separator between the first electrode plate and the second electrode plate, a can in which the electrode assembly is accommodated, the can including an opening at one side, the opening being hermetically sealed by a cap plate, and a top plate on the cap plate. The top plate includes a first welding unit and a second welding unit that are coupled to the cap plate, and a third welding unit that is between the first welding unit and the second welding unit. The first welding unit is connected to the cap plate and includes first through third welding points. The first through third welding points collectively forming a triangular shape.

The triangular shape may be a regular triangular shape.

The first welding point may be on a central line of a long-axis of the top plate.

The second welding point and the third welding point may be formed on a first vertical line that is perpendicular to the central line. The second welding point and the third welding point may be at a same distance in opposite directions from the central line.

The second welding point and the third welding point may be spaced apart by a same distance from an end of the first welding unit.

The second welding unit may include fourth through sixth welding points that collectively form a triangular shape.

The fourth through sixth welding points may collectively form a regular triangular shape.

The fourth welding point may be on a central line of a long-axis of the top plate.

The fifth welding point and the sixth welding point may be on a second vertical line perpendicular to the central line. The fifth and sixth welding point may be at a same distance in opposite directions from the central line.

The fifth welding point and the sixth welding point may be spaced apart by a same distance from an end of the second welding unit.

The cap plate may be formed of aluminum or an aluminum alloy.

Each of the first welding unit through the third welding unit may be formed of nickel or a nickel alloy.

The first through third welding units may be positive electrodes.

The rechargeable battery may further include a lead plate that is attached to the third welding unit.

The lead plate and the first through third welding unit may be formed of a same material.

Embodiments are also directed to a rechargeable battery including an electrode assembly including a first electrode plate, a second electrode plate, and a separator between the first electrode plate and the second electrode plate, a can in which the electrode assembly is accommodated, the can including an opening at one side, the opening being hermetically sealed by a cap plate, and a top plate on the cap plate. The top plate includes a first welding unit and a second welding unit that are coupled to the cap plate, and a third welding unit that is between the first welding unit and the second welding unit. The first welding unit is coupled to the cap plate and includes first through third welding points. The second welding unit is coupled to the cap plate and includes fourth through sixth welding points. The first through third welding points collectively form a triangular shape, and the fourth and sixth welding points collectively form a triangular shape.

The first welding point and the fourth welding point may be on a central line of a long-axis of the top plate.

The second welding point and the third welding point may be on a first vertical line that is perpendicular to the central line and may be spaced apart from an end of the first welding unit. The second welding point and the third welding point are at the same distance from the first welding point.

The fifth welding point and the sixth welding point may be on a first vertical line that is perpendicular to the central line and is spaced apart from an end of the second welding unit. The fifth welding point and the sixth welding point may each be at a same distance from the fourth welding point.

The cap plate and the first through third welding units may be formed of different materials.

Embodiments are also directed to a rechargeable battery including an electrode assembly that includes a first electrode plate, a second electrode plate, and a separator between the first electrode plate and the second electrode plate, a can in which the electrode assembly is accommodated, the can having a hexahedral shape including an opening at one side, the opening being hermetically sealed by a cap plate, and a top plate on the cap plate. The top plate includes a first welding unit that is coupled to the cap plate and includes first through third welding points, and a second welding unit that is at a side of the first welding unit. The first welding point is on a central line of a long-axis of the top plate. The second welding point and the third welding point are on a first vertical line that is perpendicular to the central line and spaced apart from an end of the first welding unit, the second and third welding points being at a same distance in opposite directions from the central line.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
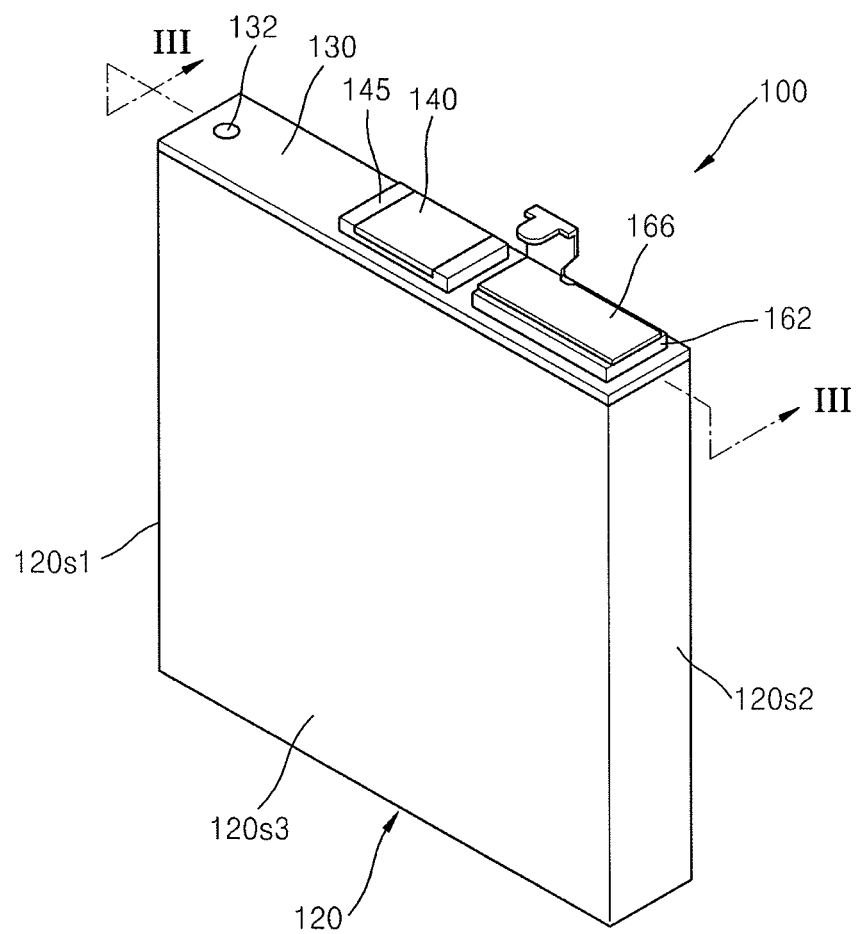
FIG. 1 illustrates a perspective view illustrating a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

The terms "first," "second," and the like, as used herein do not denote any order, quantity, or importance, but rather are used to distinguish one element, from another. The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise.

Figure 2:
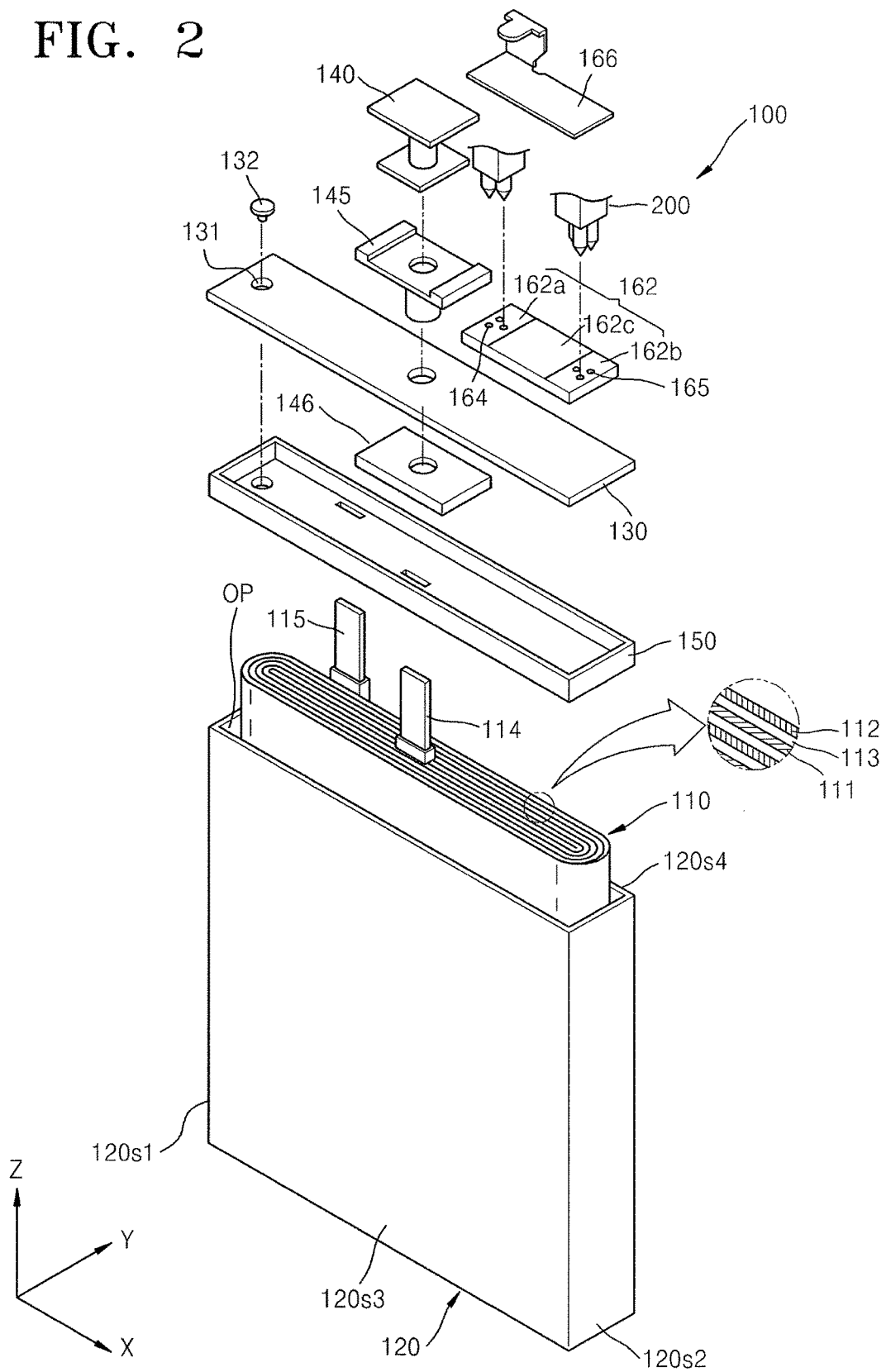
FIG. 2 illustrates an exploded perspective view illustrating the rechargeable battery of FIG. 1.
Figure 3:
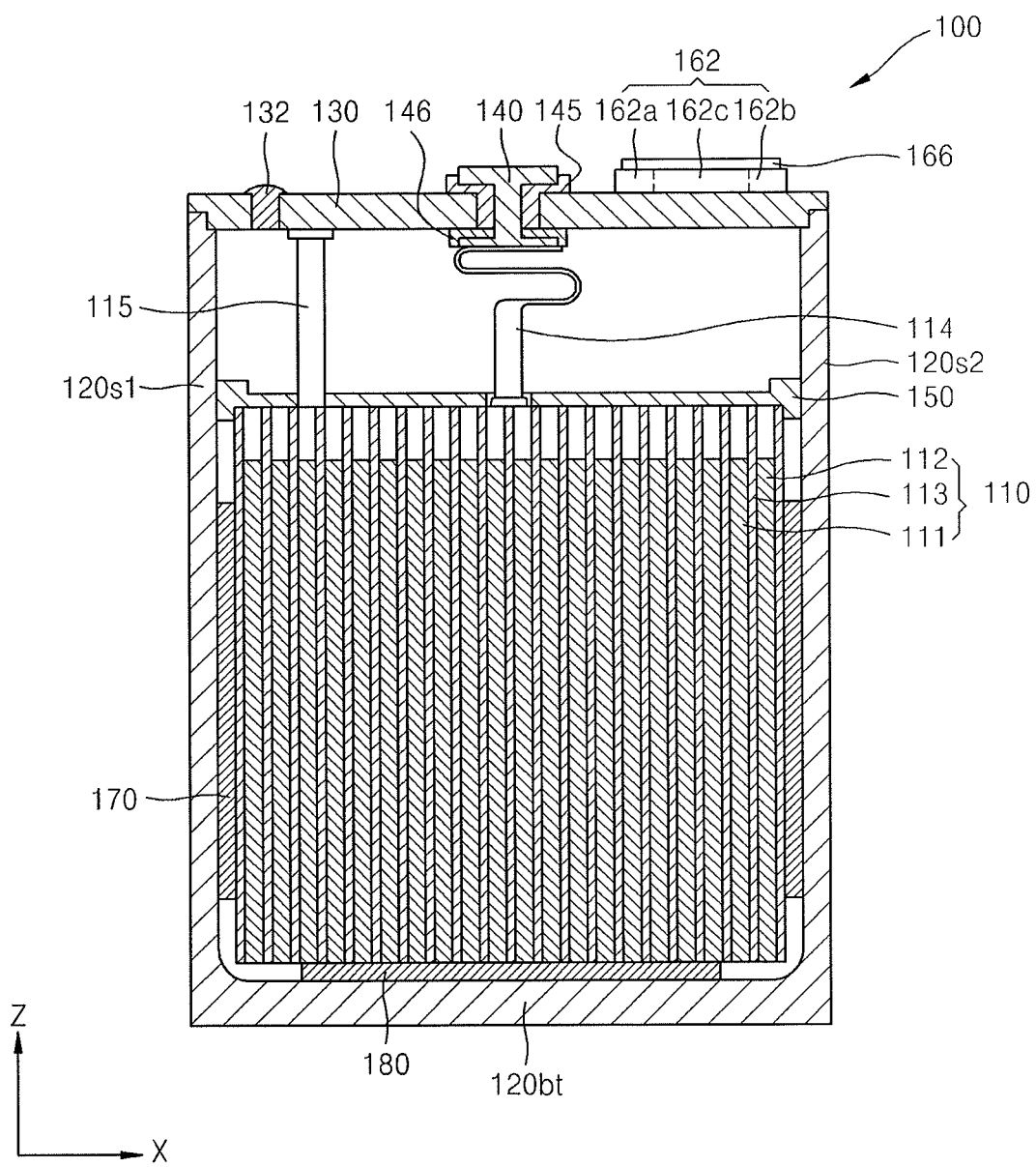
FIG. 3 illustrates a cross-sectional view taken along line III-III of FIG. 1.

FIG. 1 illustrates a perspective view illustrating a rechargeable battery 100 according to an embodiment. FIG. 2 illustrates an exploded perspective view illustrating the rechargeable battery 100 of FIG. 1. FIG. 3 illustrates a cross-sectional view taken along line III-III of FIG. 1.

Referring to FIGS. 1 through 3, the rechargeable battery 100 may include an electrode assembly 110, a can 120 that accommodates the electrode assembly 110, and a cap plate 130 that hermetically seals the can 120.

The electrode assembly 110 may include first and second electrode plates 111 and 112 on which an electrode active material is coated and a separator 113 disposed between the first electrode plate 111 and the second electrode plate 112. The electrode assembly 110 may be manufactured by forming a stacked structure in which the first electrode plate 111, the separator 113, and the second electrode plate 112 are sequentially stacked, and winding the stacked structure in a jelly roll shape. The first electrode plate 111 and the second electrode plate 112 may be respectively electrically connected to a first electrode tab 114 and a second electrode tab 115 in order to extract charges generated due to a chemical reaction to the outside. The first electrode tab 114 and the second electrode tab 115 may extend in the same direction. For example, the first and second electrode tabs 114 and 115 may extend toward an opening OP of the can 120.

Although the electrode assembly 110 is illustrated as having a jelly roll shape, in other implementations, the electrode assembly 110 may have a stacked structure in which the separator 113 is disposed between the first electrode plate 111 and the second electrode plate 112.

The can 120 having a hexahedral shape whose top surface is opened may be formed of a metal material in order to ensure sufficient strength. For example, the can 120 may be formed of aluminum or an aluminum alloy. The electrode assembly 110 soaked in an electrolyte may be accommodated inside the can 120. In this case, in order to prevent an unnecessary short-circuit between the electrode assembly 110 and the can 120 formed of a metal material, the electrode assembly 110 may be accommodated in the can 120 while being surrounded by a second insulating member 170. After the electrode assembly 110 is accommodated in the can 120, the opening OP may be hermetically sealed by the cap plate 130.

The cap plate 130 and the can 120 may be connected to each other by using laser welding to maintain a hermetically sealed state.

The cap plate 130 may include an electrolyte injection hole 131. After the cap plate 130 and the can 120 are coupled to each other, an electrolyte may be injected through the electrolyte injection hole 131, and the electrolyte injection hole 131 may be hermetically sealed by using a plug 132. In other implementations, the electrolyte injection hole 131 in the cap plate 130 may be omitted. In this case, before the cap plate 130 and the can 120 are integrally coupled to each other by using laser welding, an electrolyte may be injected.

Like the can 120, the cap plate 130 may be formed of a metal material. For example, the cap plate 130 may be formed of aluminum or an aluminum alloy, as examples.

An electrode terminal 140 and a top plate 162 may be disposed on the cap plate 130. A top surface of the electrode terminal 140 may be exposed to the outside through a top surface of the cap plate 130, and a lower portion of the electrode terminal 140 may pass through the cap plate 130 and extend into the can 120.

The top plate 162 may be attached to the cap plate 130 by using welding. The welding may be ultrasonic welding. The top plate 162 may be formed of nickel or a nickel alloy, as examples.

The top plate 162 may include a first welding unit 162a and a second welding unit 162b which are welded to the cap plate 130 and on which a plurality of welding points are formed, and a third welding unit 162c to which a lead plate 166 is attached.

The first and second welding units 162a and 162b are formed on both end portions of the top plate 162, and include welding points 164 and 165 each collectively forming a triangular shape.

The third welding unit 162c is formed between the first welding unit 162a and the second welding unit 162b.

The lead plate 166 coupled to the top plate 162 may be formed of the same metal material as that of the top plate 162. For example, the lead plate 166 may be formed of nickel or a nickel alloy, as examples.

Since the lead plate 166 and the cap plate 130 are formed of different metal materials, in order to electrically connect the lead plate 166 and the cap plate 130, the top plate 162 is coupled to the cap plate 130 by using ultrasonic welding.

In order to increase an adhesive force between the top plate 162 and the cap plate 130, a plurality of welding points are desirable. However, when the top plate 162 and the cap plate 130 are coupled to each other by using a plurality of welding points, there may be a limitation in securing a space for coupling the lead plate 166 to the top plate 162.

Accordingly, welding points for coupling the top plate 162 to the cap plate 130 may be formed in consideration of a space for coupling the lead plate 166 to the top plate 162, which will be explained in detail with reference to FIGS. 4 and 5.

FIG. 2 also shows a horn 200 of an ultrasonic welding device used in welding the top plate 162 and the cap plate 130, as described more fully below with respect to FIG. 5. It is to be understood that the ultrasonic welding device is not a component of the secondary battery 100.

Referring to FIG. 3, the electrode terminal 140 may have a first polarity by being electrically connected to the first electrode tab 114 of the electrode assembly 110.

The cap plate 130 may have a second polarity by being electrically connected to the second electrode tab 115 of the electrode assembly 110. The top plate 162 and the can 120, connected to the cap plate 130 by using welding, may also have the second polarity.

For example, the top plate 162 connected to the cap plate 130 may function as a positive electrode of the rechargeable battery 100, and the electrode terminal 140 may function as a negative electrode of the rechargeable battery 100. In this case, in order to prevent a short-circuit between the cap plate 130 and the electrode terminal 140, a first gasket 145 and a second gasket 146 including an insulating material may be provided between the cap plate 130 and the electrode terminal 140. The first gasket 145 may be disposed to contact a top surface of the cap plate 130, and the second gasket 146 may be disposed to contact a bottom surface of the cap plate 130. Although the first and second gaskets 145 and 146 are shown as separate members in FIG. 2, the first and second gaskets 145 and 146 may be integrated with each other. In order to electrically insulate the can 120 having the second polarity due to the welding to the cap plate 130 from an external object or another rechargeable battery 100, insulating films (not shown) that cover first and second side surfaces 120s1 and 120s2 of the can 120 may be attached to both side surfaces of the can 120.

A first insulating member 150 that is disposed on the electrode 110 may be provided in the can 120. The first insulating member 150 may insulate the electrode assembly 110 from the cap plate 130.

In other embodiments, the first insulating member 150 may insulate the electrode assembly 110 from the cap plate 130 and may restrict a movement of the electrode assembly 110 in the can 120. The first insulating member 150 may have a through-hole through which the first and second electrode tabs 114 and 115 may extend toward the opening OP, and may include a hole that is formed at a position corresponding to the electrolyte injection hole 131 and through which an electrolyte injected through the electrolyte injection hole 131 flows. A third insulating member 180 may be disposed under the electrode assembly 110, to prevent an unnecessary short-circuit between the electrode assembly 110 and the can 120 formed of a metal material.

As depicted in FIGS. 2 and 3, the can 120 may include the opening OP formed in the top surface, includes a bottom surface 120bt opposite in position to the opening OP, and the first side surface 120s1, the second side surface 120s2, a third side surface 120s3, and a fourth side surface 120s4 which are disposed between the opening OP and the bottom surface 120bt and are bent in a direction perpendicular to the bottom surface 120bt. The first side surface 120s and the second side surface 120s2 may be opposite and parallel to each other, and the third side surface 120s3 and the fourth side surface 120s4 may be opposite and parallel to each other. The can 120 may be formed to have a substantially rectangular parallelepiped shape. In this case, widths of the first side surface 120s1 and the second side surface 120s2 may be less than widths of the third side surface 120s3 and the fourth side surface 120s4.

A structure of the top plate 162 coupled to the top surface of the cap plate 130 will now be explained.

Figure 4:
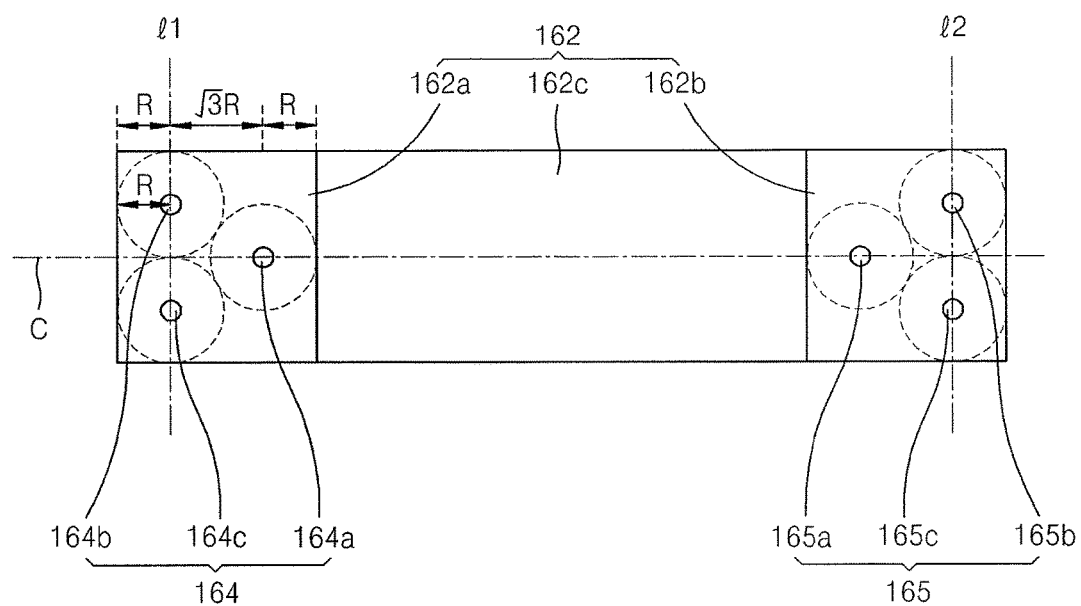
FIG. 4 illustrates a plan view illustrating a cap plate including welding points of FIG. 2.

FIG. 4 illustrates a plan view illustrating the top plate 162 including the plurality of welding points 164 and 165 of FIG. 2.

Referring to FIG. 4, the top plate 162 may include the first welding unit 162a, the second welding unit 162b, and the third welding unit 162c disposed between the first welding unit 162a and the second welding unit 162b.

The first welding unit 162a and the second welding unit 162b on which ultrasonic welding is performed in order to couple the top plate 162 to the cap plate 130 (see FIG. 2) may respectively include the plurality of welding points 164 and 165 formed due to the ultrasonic welding.

When an area of the top plate 162 is constant, an area of the third welding unit 162c that is formed between the first welding unit 162a and the second welding unit 162b and to which the lead plate 166 (see FIG. 2) is coupled may vary according to areas of the first and second welding units 162a and 162b.

When the plurality of welding points 164 and 164 are formed on the first and second welding units 162a and 162b, an adhesive force between the top plate 162 and the cap plate 130 (see FIG. 2) may be increased. However, when a number of welding points of the top late 162 is increased, spaces of the first and second welding units 162a and 162b including welding points are increased. An area of the third welding unit 162c in the top plate 162 may be reduced. Accordingly, there may be a limitation in coupling the lead plate 166 (see FIG. 2) to the third welding unit 162c.

A structure for maintaining a minimum adhesive force between the top plate 162 and the cap plate 130 (see FIG. 2) and ensuring a maximum area of the third welding unit 162c to which the lead plate 166 (see FIG. 2) is coupled is desirable.

A first welding point 164a of the first welding unit 162a may be formed on a central line c of a long-axis of the top plate 162 and is spaced apart by a first distance R from a boundary surface of the first welding unit 162a and the third welding unit 162c toward the first welding unit 162a.

Second and third welding points 164b and 164c may be disposed on a first vertical line l1 perpendicular to the central line c, and may be disposed each at the same distance R in opposite directions from the central line c.

Also, the second and third welding points 164b and 164c may be formed to be spaced apart by the first distance R from an outer end of the first welding unit 162a.

The first through third welding points 164a, 164b, and 164c which are spaced apart from another by the same distance may collectively form a triangular shape, for example. The first welding point 164a formed on the central line c and the second and third welding points 164b and 164c formed each at the same distance from the first vertical line l1 perpendicular to the central line c may be collectively form a triangular shape.

The first through third welding points 164a, 164b, and 164c formed on the first welding unit 162a may collectively form a triangular shape. Accordingly a space occupied by the first through third welding points 164a, 164b, and 164c in the top plate 162 may be minimized and an area of the welding units 162a and 162b may be reduced, thereby making it possible to maximize a space occupied by the third welding unit 162c.

A vertical distance from the first welding point 164a to the first vertical line l1 that connects the second and third welding points 164b and 164c is a second distance $\sqrt{3}R$. Thus, the first welding unit 162a may have a smaller area than that when four welding points having a square shape are formed. The second and third welding points 164b and 164c may be formed on both end portions of the top plate 162. Accordingly, the top plate 162 coupled to the cap plate 130 may be hindered or prevented from coming off. The first welding point 164a may be formed at equal distances 2R from the second and third welding points 164b and 164c. Accordingly, a space for coupling the top plate 162 to the cap plate 130 may be minimized and a high adhesive force between the cap plate 130 and the top plate 162 may be ensured. Accordingly, a sufficient space of the third welding unit 162c for welding the lead plate 166 to the top plate 162 may be ensured.

A shape of each of the first through third welding points 164a, 164b, and 164c does not have to be a perfectly circular shape, but is shown as a circular shape for convenience of explanation.

A fourth welding point 165a of the second welding unit 162b may be formed on the central line c of the long-axis of the top plate 162 and may be spaced by the first distance R from a boundary surface of the second welding unit 162b and the third welding unit 162c toward the second welding unit 162b.

Fifth and sixth welding points 165b and 165c may be disposed on a second vertical line 12 perpendicular to the central line c, and may be disposed each at the same distance R in opposite directions from the central line c.

Also, each of the fifth and sixth welding points 165b and 165c may be formed to be spaced by the first distance R from an outer end of the second welding unit 162b.

The fourth through sixth welding points 165a, 165b, and 165c may be spaced apart from another by the same distance to collectively form a regular, e.g., equilateral, triangular shape. In other implementations, the fourth welding unit 165a formed on the central line c and the fifth and sixth welding points 165b and 165c formed each at the same distance from the second vertical line 12 perpendicular to the central line c may be collectively form a triangular shape.

The fourth through sixth welding points 165a, 165b, and 165c formed on the second welding unit 162b may collectively form a triangular shape. Accordingly, a space occupied by the welding point 165 may be minimized.

Also, a vertical distance from the fourth welding point 165a to the second vertical line 12 that connects the fifth and sixth welding points 165b and 165c may be a second distance $\sqrt{3}R$, and thus the second welding unit 162b may have a smaller area than that when four welding points having a square shape are formed. Also, the fifth and sixth welding points 165b and 165c may be formed on both end portions of the top plate 162. Accordingly, the top plate 162 coupled to the cap plate 130 may be hindered or prevented from coming off. The fourth welding point 165a may be formed at equal distance 2R from the fifth and sixth welding points 165b and 165c. Accordingly, a space for coupling the top plate 162 to the cap plate 130 may be minimized and a high adhesive force between the cap plate 130 and the top plate 162 may be ensured. Accordingly, a sufficient space of the third welding unit 162c to which the lead plate 166 (see FIG. 2) is welded in the top plate 162 may be ensured.

A shape of each of the fourth through sixth welding points 165a, 165b, and 165c does not have to be a perfectly circular shape, but is shown as a circular shape for convenience of explanation.

Figure 5:
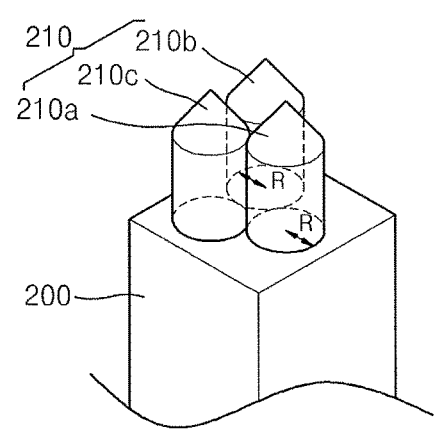
FIG. 5 illustrates a perspective view illustrating a horn of an ultrasonic welding device for forming the welding points of FIG. 4, according to an embodiment.

FIG. 5 illustrates a perspective view illustrating a horn 200 of an ultrasonic welding device for forming the welding points 164 and 165 of FIG. 4, according to an embodiment.

Referring to FIG. 5, the horn 200 of the ultrasonic welding device may include a contact member 210 that pressurizes the top plate 162 in order to couple the top plate 162 to the cap plate 130 (see FIG. 2). The contact member 210 may include first through third contact members 210a, 210b, and 210c each having a circular cylindrical shape whose width decreases toward an end portion for example.

The first through third contact members 210a, 210b, and 210c contacting the horn 200 may have the same radius R, and may contact one another to form a triangular shape.

The first through third contact members 210a, 210b, and 210c may pressurize the first and second welding units 162a and 162b and transmit ultrasonic waves to the top plate 162. The first through third welding points 164a, 164b, and 164c or the fourth through sixth welding points 165a, 165b, and 165c may be formed on the first or second welding units 162a or 162b due to the first through third contact members 210a, 210b, and 210c.

By way of summation and review, in order to couple a top plate to a cap plate, it is desirable that welding be preformed at a plurality of points. Embodiments may provide a rechargeable battery including a top plate that may ensure a sufficient adhesive force with a cap plate and may provide a space for coupling a lead plate.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope as set forth in the following claims.

What is claimed is:

1. A rechargeable battery, comprising:
   an electrode assembly including a first electrode plate, a second electrode plate, and a separator between the first electrode plate and the second electrode plate;
   a can in which the electrode assembly is accommodated, the can including an opening at one side, the opening being hermetically sealed by a cap plate;
   a top plate on the cap plate, the top plate having a rectangular shape including two short sides and two long sides; and
   a lead plate on the top plate,
   wherein:
   the top plate includes:
      a first welding unit and a second welding unit at which an nickel or nickel alloy surface of the top plate is ultrasonically welded to an aluminum or aluminum alloy surface of the cap plate, the first welding unit and the second welding unit being at opposite end areas of the top plate, and
      a third welding unit, the third welding unit being an area of the top plate between the first welding unit and the second welding unit to which the lead plate is welded, and
   the first welding unit includes first through third welding points at which the nickel or nickel alloy surface of the top plate is ultrasonically welded to the aluminum or aluminum alloy surface of the cap plate, the first through third welding points collectively forming an equilateral triangular shape in which the first, second, and third welding points are respectively spaced apart from each other by a same first distance, at least one of the first, second, and third welding points being spaced apart from an adjacent short side of the top plate by a second distance that is one-half of the first distance.

2. The rechargeable battery as claimed in claim 1, wherein the first welding point is on a central line of a long-axis of the top plate.

3. The rechargeable battery as claimed in claim 2, wherein:
   the second welding point and the third welding point are formed on a first vertical line that is perpendicular to the central line, and the second welding point and the third welding point are at a same distance in opposite directions from the central line.

4. The rechargeable battery as claimed in claim 1, wherein the second welding point and the third welding point are spaced apart by the second distance from the adjacent short side of the top plate.

5. The rechargeable battery as claimed in claim 1, wherein the second welding unit includes fourth through sixth welding points that collectively form an equilateral triangular shape in which the fourth, fifth, and sixth welding points are respectively spaced apart from each other by the first distance, at least one of the fourth, fifth, and sixth welding points being spaced apart from an opposite adjacent short side of the top plate by the second distance.

6. The rechargeable battery as claimed in claim 5, wherein the fourth welding point is on a central line of a long-axis of the top plate.

7. The rechargeable battery as claimed in claim 6, wherein:
the fifth welding point and the sixth welding point are on a second vertical line perpendicular to the central line, and
the fifth and sixth welding points are at a same distance in opposite directions from the central line.

8. The rechargeable battery as claimed in claim 5, wherein the fifth welding point and the sixth welding point are spaced apart by the second distance from the opposite adjacent short side of the top plate.

9. The rechargeable battery as claimed in claim 1, wherein the top plate is formed entirely of nickel or a nickel alloy.

10. The rechargeable battery as claimed in claim 1, wherein the top plate is a positive electrode.

11. The rechargeable battery as claimed in claim 1, wherein the lead plate and the top plate are formed of a same material.

12. A rechargeable battery, comprising:
an electrode assembly including a first electrode plate, a second electrode plate, and a separator between the first electrode plate and the second electrode plate;
a can in which the electrode assembly is accommodated, the can including an opening at one side, the opening being hermetically sealed by a cap plate;
a top plate on the cap plate, the top plate having a rectangular shape including two short sides and two long sides; and
a lead plate on the top plate, and
wherein:
the top plate includes:
a first welding unit and a second welding unit at which an nickel or nickel alloy surface of the top plate is ultrasonically welded to an aluminum or aluminum alloy surface of the cap plate, the first welding unit and the second welding unit being at opposite end areas of the top plate, and
a third welding unit, the third welding unit being an area of the top plate between the first welding unit and the second welding unit at which the lead plate is welded to the top plate,
the first welding unit includes first through third welding points at which the nickel or nickel alloy surface of the top plate is ultrasonically welded to the aluminum or aluminum alloy surface of the cap plate, the first through third welding points collectively forming an equilateral triangular shape in which the first, second, and third welding points are respectively spaced apart from each other by a same first distance, at least one of the first, second, and third welding points being spaced apart from an adjacent short side of the top plate by a second distance that is one-half of the first distance,
the second welding unit is coupled to the cap plate and includes fourth through sixth welding points, the fourth through sixth welding points collectively forming an equilateral triangular shape in which the fourth, fifth, and sixth welding points are respectively spaced apart from each other by the first distance, at least one of the fourth, fifth, and sixth welding points being spaced apart from an opposite adjacent short side of the top plate by the second distance.

13. The rechargeable battery as claimed in claim 12, wherein the first welding point and the fourth welding point are on a central line of a long-axis of the top plate.

14. The rechargeable battery as claimed in claim 13, wherein:
the second welding point and the third welding point are on a first vertical line that is perpendicular to the central line and are spaced apart from the adjacent short side of the top plate by the second distance, and
the second welding point and the third welding point are at a same distance from the first welding point.

15. The rechargeable battery as claimed in claim 13, wherein:
the fifth welding point and the sixth welding point are on a first vertical line that is perpendicular to the central line and are spaced apart from the opposite adjacent short side of the top plate by the second distance, and
the fifth welding point and the sixth welding point are each spaced apart from the fourth welding point by the first distance.

* * * * *